(12) United States Patent
Safko

(10) Patent No.: US 7,072,949 B1
(45) Date of Patent: Jul. 4, 2006

(54) SYSTEM AND METHOD FOR PROVIDING PAPER MODELS OVER A WIDE AREA COMPUTER NETWORK

(75) Inventor: Lon S. Safko, 2044 Ridgeline Ave., Vista, CA (US) 92083

(73) Assignee: Lon S. Safko, Gilbert, AZ (US)

( * ) Notice: Subject to any disclaimer, the term of this patent is extended or adjusted under 35 U.S.C. 154(b) by 952 days.

(21) Appl. No.: 09/665,368

(22) Filed: Sep. 19, 2000

(51) Int. Cl.
*G06F 15/16* (2006.01)

(52) U.S. Cl. .......................... 709/219; 705/26

(58) Field of Classification Search ............ 709/219; 273/155; 705/14, 26; 707/315; 703/1; 235/380; 428/195.1; 425/385
See application file for complete search history.

(56) References Cited

U.S. PATENT DOCUMENTS

| | | | |
|---|---|---|---|
| 6,009,410 A * | 12/1999 | LeMole et al. ............... | 705/14 |
| 6,196,458 B1 * | 3/2001 | Walker et al. .............. | 235/380 |
| 6,248,426 B1 * | 6/2001 | Olson et al. ............ | 428/195.1 |
| 6,256,595 B1 * | 7/2001 | Schwalb et al. ............... | 703/1 |
| 6,311,142 B1 * | 10/2001 | Glassner ......................... | 703/1 |
| 6,415,320 B1 * | 7/2002 | Hess et al. ................... | 709/219 |
| 6,484,148 B1 * | 11/2002 | Boyd ........................... | 705/14 |
| 6,519,584 B1 * | 2/2003 | Tognazzini et al. ............ | 707/3 |
| 6,523,826 B1 * | 2/2003 | Matos ........................ | 273/155 |
| 6,556,989 B1 * | 4/2003 | Naimark et al. ............... | 707/5 |
| 6,578,011 B1 * | 6/2003 | Forward ...................... | 705/14 |
| 2003/0068399 A1 * | 4/2003 | Vass ........................... | 425/385 |

OTHER PUBLICATIONS

KittyHawk Software, Inc. "Origami Flowers", Oct. 13, 1999.*
Alex Barber, "Origami: Diagrams", Aug. 31, 2000.*
KittyHawk, Software, Inc., Oct. 13, 1999.*
KittyHawk Software, Inc. May 8, 1999.*
"Print and Build Western Building", KittyHawk Software, Inc., May 7, 1999.*
Phil Heiple, "Download-a-Dinosaur", Jul. 10, 1997, pp. 1-4.*
"Paper PhotoCube Software—NEW Version: 1.1", Jan. 1999.*
"Paper PhotoCube Examples", Aug. 1999.*
Joseph Wu, "Diagrams for Origami Models", Sep. 1999.*
Kevin Kwan, "Idea for FST -> Polygons to Paper Models!", Feb. 9, 1998.*

* cited by examiner

*Primary Examiner*—Jungwon Chang
(74) *Attorney, Agent, or Firm*—Lon S. Safko

(57) ABSTRACT

A system for providing paper models over a wide area computer network includes a user computer that communicates with a model server via the Internet. The model server includes a database of paper model files, e.g., the pieces of the models and assembly instructions. The corresponding method allows a user to access the model server via the Internet and download paper models. The paper models are printed at a printer connected to the user computer. A user can then assemble the paper models following the assembly instructions.

1 Claim, 3 Drawing Sheets

SYSTEM AND METHOD FOR PROVIDING PAPER MODELS OVER A WIDE AREA COMPUTER NETWORK

TECHNICAL FIELD

The present invention relates generally to Internet commerce and Internet advertising.

BACKGROUND OF THE INVENTION

The present invention recognizes that powerful advertising can be had by disseminating objects representative of an advertising company or product to the public, normally for free. For instance, the well-known orange "76" ball has been provided for years for placement on car antennae to effectively advertise a particular oil company at minimal cost to the advertiser. It is not necessary that such advertising objects explicitly display the name of a product or company, but only that the objects please the consumer in some way, who is then reminded of the advertiser from time to time.

In considering this advertising phenomenon, the present invention further recognizes that an ever-increasing amount of commerce is undertaken electronically over the World Wide Web. Most if not all Web advertising consists of advertising banners and pages that can be clicked on to transport a user to another Web site associated with the advertiser. Currently, the only way to combine the provision of objects, advertising or otherwise, to the public using Web-based commerce is to mail an object to a Web user in response to the user ordering the object via the Web. In the case of conventional sales of goods for money, this is expected and currently is acceptable. In the case of freely-provided advertising objects, however, the present invention recognizes that the provision of the objects preferably happens in real-time, as the user is actually using the Web, to promote the interest of the user in the object before the novelty of viewing the Web page wears off. Also, the present invention recognizes that because advertising objects are normally provided for free or at some de minimis cost, the cost of producing and distributing the objects preferably remains small. With the above considerations in mind, the present invention has provided the solutions set forth herein.

SUMMARY OF THE INVENTION

A method for providing paper models includes allowing a user to access a computer site on a wide area computer network. On the computer site, at least one model page is provided and the user is permitted to access the model page. If interested, the user is also permitted to print a data file from the model page. The data file is useful for causing a computer printer to print a substrate having model indicia thereon, wherein the model indicia is useful for configuring the substrate into a paper model.

In a presently preferred embodiment, the data file is further useful for causing the computer printer to print assembly instructions for the paper model. Preferably, accounting data is generated when the user accesses the model page and/or when the user, prints the data file. In a preferred embodiment, at least one hyperlink to the model page is provided, whereby the user accesses the model page by clicking on the hyperlink. Preferably, an image of an object on the model page is presented to the user and the user prints the model by downloading the corresponding data file or by printing the model directly from the model page by, e.g., clicking on the image on the model page.

In another aspect of the present invention, a system for providing paper models includes a user computer and a model server. In this aspect of the present invention, the user computer communicates with the model server via a wide area computer network. Furthermore, the model server includes a module that has means for providing files representing paper models to the user computer via the wide area computer network.

The present invention will now be described, by way of example, with reference to the accompanying drawings, in which:

DESCRIPTION OF AN EMBODIMENT OF THE INVENTION

Figure 1:
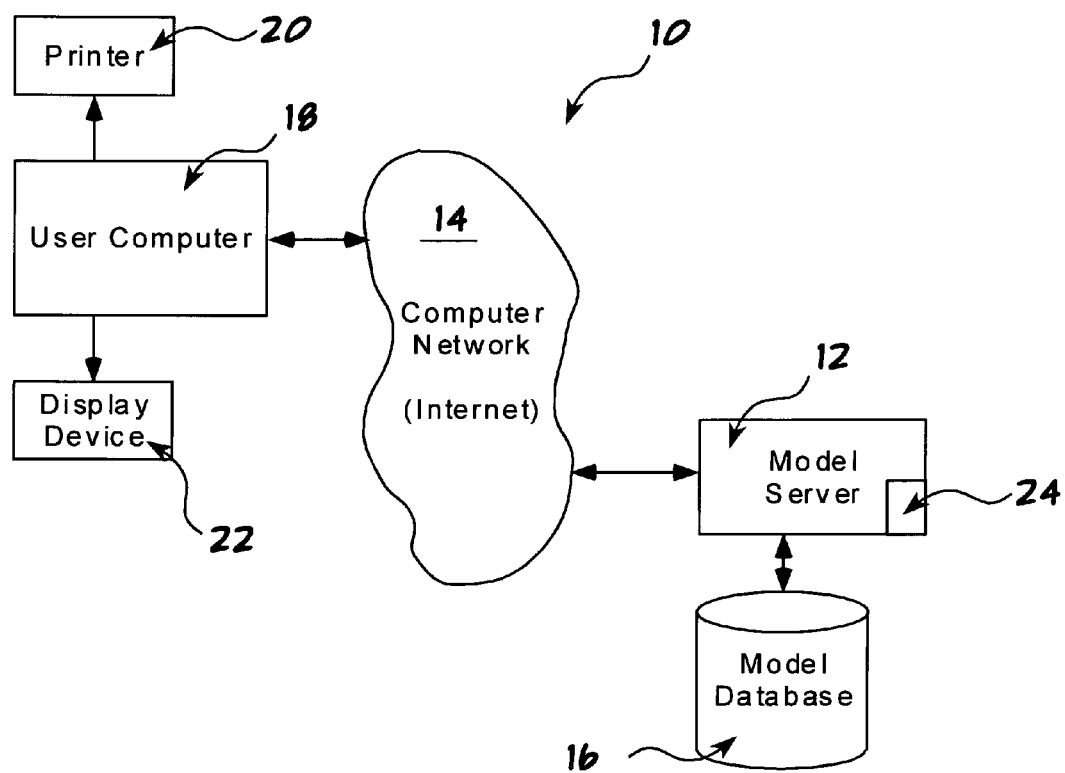
FIG. 1 is a schematic diagram of the architecture of the present invention.

Referring initially to FIG. 1, a system is shown, generally designated 10, which includes one or more server computers (only one server shown for clarity), referred to herein as a model server 12, which is part of a computer network 14. In the preferred embodiment, the model server 12 is part of the computer network 14 referred to as the Internet, and the model server 12 can communicate with other computers on the network 14 via a modem, LAN, WAN, or other network device. As shown in FIG. 1, the model server 12 is connected to a model database 16 in which information concerning paper models is stored. FIG. 1 also shows a user computer 18, e.g., a laptop computer, desktop computer, or a palmtop computer, connected to the computer network 14. The user computer 18 can communicate with the model server 12 via the internet 14 to allow a user to view images of the paper models and print them if interested. To facilitate the process of obtaining the paper models from the model server 12, a printer 20 and a display device 22, e.g., a monitor, are connected to the user computer 18. Although FIG. 1 shows a single user computer 18 connected to the computer network 14, it is to be appreciated that many user computers may be connected to the network 14.

As intended by the present invention, the paper models in the database 16 and available via the model server 12 are three dimensional models when constructed that include houses, historic buildings, museums, bridges, and other structures of interest. Moreover, the paper models include automobiles, airplanes, trains, boats, motorcycles, bicycles, and other powered or unpowered vehicles. Still other models include corporate products and services with trademarks, e.g., a Pepsi® can, cereal boxes, destination postcards, sports cards, action figures, and 3D stereoscopic (Keystone Viewer type) photography.

Figure 2:
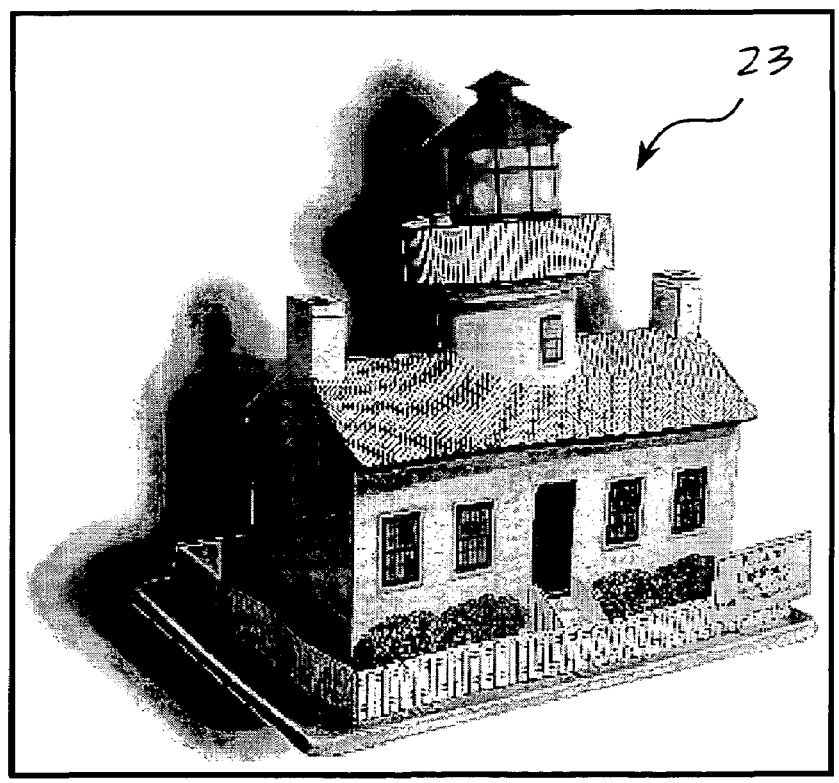
FIG. 2 is a perspective view of a model of the present invention.

One such model is shown in FIG. 2 and generally designated 23. As shown, the preferred model 23 consists of paper substrate(s) that are folded and/or cut along indicia to form a 3-D structure. The information stored in the model database 16 includes files that represent various pieces to the paper models which, as described below, may be downloaded to the user computer 18 and printed on a substrate, e.g., paper, using the printer 20, or the models may be printed directly off the displayed page. The model information also includes assembly instructions that are provided to a user. Once printed, the user may cut and/or fold the pieces from the substrate and assemble the models following the instructions.

Figure 3:
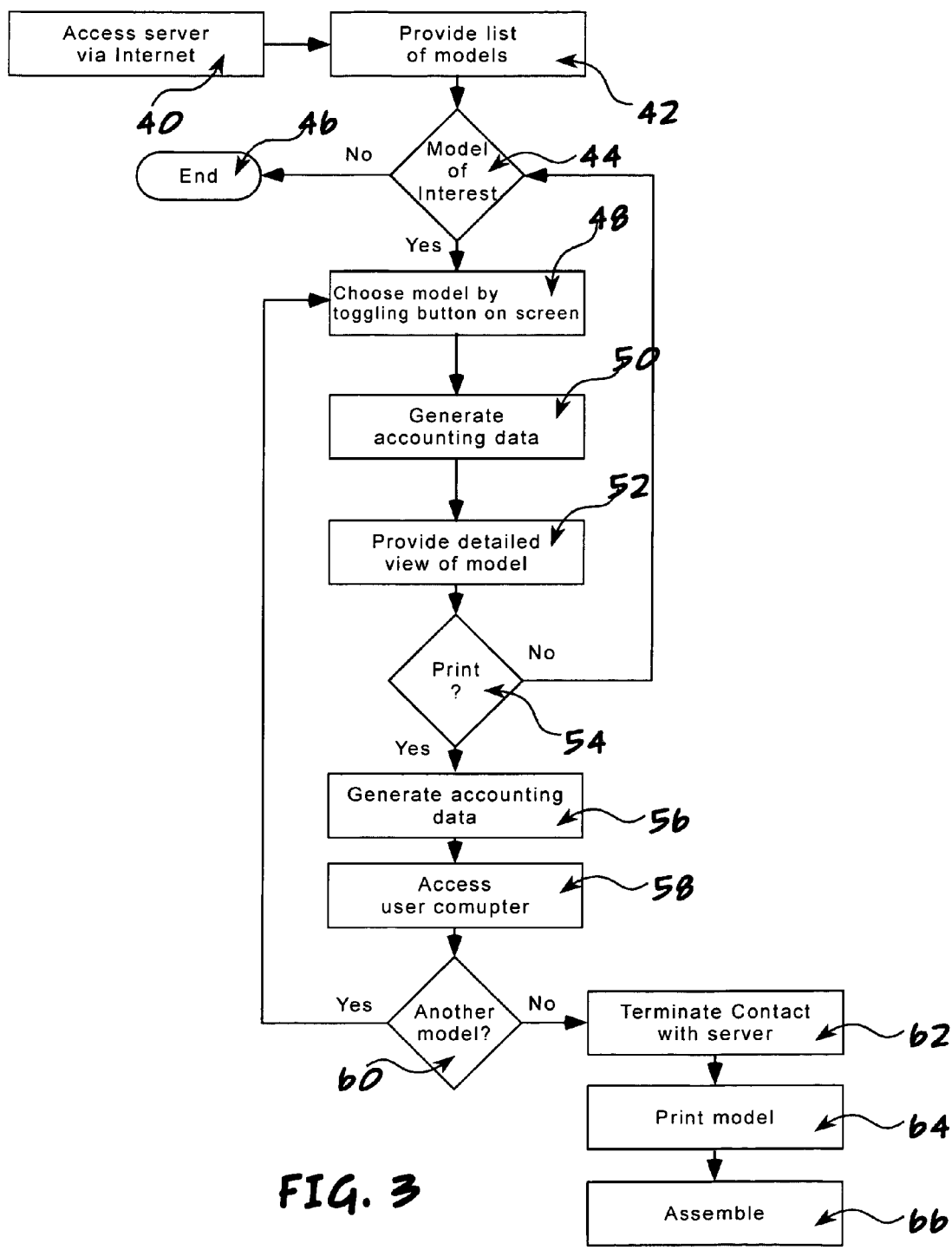
FIG. 3 is a flow chart of the present logic.

FIG. 3 illustrates the structure of the modules 24 of the present invention as embodied in computer program software. Those skilled in the art will appreciate that FIG. 3 illustrates the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in FIG. 3.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device.

Referring now to FIG. 3, the logic steps for a method for providing paper models over a wide area computer network can be seen. Commencing at block 40, a user accesses the model server 12 via the computer network 14. Thereafter, at block 42, the model server 12 provides a list of available paper models to the user, e.g., by transmitting a model page that is viewed at the display device 22 connected to the user computer 18. Proceeding to decision diamond 44, it is determined whether the user has found a model of interest. If not, the logic ends at state 46. If so, the user may choose the model of interest by toggling a button displayed at the display device 22 by clicking a mouse 99 over the button at block 48. It is to be understood that "button" can include any means of navigation, such as a hyperlink, thumbnail, or graphic. In the preferred embodiment, at block 50 accounting data is generated based on the user accessing a model file at block 48, either by clicking on it or simply by accessing the model page by, e.g., clicking on a button (e.g., hyperlink) to the page. Additionally, the user may click the mouse on the title of the model or on a thumbnail image of the model to choose the model of interest at block 48.

From block 50, the logic moves to block 52 where the model server 12 transmits detailed images of the paper model, e.g., orthographic views of the model, that can be viewed by the user at the display device 22. Then, the logic moves to decision diamond 54 where it is determined whether or not the user wishes to print the model. If so, at block 56, further accounting data representing the printing is generated when a user clicks on an access button. If not, the logic returns to decision diamond 44, where the user can decide if there is another model of interest. Thereafter, the logic continues as described above.

From block 56, the logic proceeds to block 58 where a file representing the paper model and assembly instructions are provided to the user computer 18. The accounting data generated above can be provided to a third party payer or to the user for subsequent fund transfer based thereon.

Continuing to decision diamond 60, it is determined whether the user wishes to repeat the above steps for another paper model. If so, the logic loops back to block 48 where the user can choose another model following the steps described above. If, at decision diamond 60, the user does not want to choose another paper model, the logic proceeds to block 62 where contact is terminated with the server. Moving to block 64, if the file was downloaded to hard disk the user can print the file, which represents paper substrates having indicia printed thereon. Recall that alternatively, the user could print a .gif, .jpeg, .pdf, or other file directly off the model page if desired. In any case, the indicia can include written assembly instructions, dashed fold lines, solid "cut" lines, and so on. At block 66, the user assembles the paper model using the indicia. It is to be appreciated that a user can access the model server 12 and the, e.g., model page directly, as described above, or a user may access the, e.g., model page by clicking the mouse on a button at another site.

With the configuration of structure described above, it is to be appreciated that system and method for providing paper models over a wide area computer network allows users to access paper models from a server and print the paper models using a standard printer. After the models are printed, the user can assemble the models using instructions provided by the server.

While the particular SYSTEM AND METHOD FOR PROVIDING PAPER MODELS OVER A WIDE AREA COMPUTER NETWORK as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

I claim:

1. A method for providing three-dimensional paper models, which represent replications of actual and fictional objects, comprising:

generating a model file at least in part using graphic shapes and/or photography of the actual objects, wherein the photography of the actual objects are modified by software graphic package to eliminate parallax views and distortions, sized, and edited to produce two-dimensional shapes;

storing the model file on a data storage device, the model file being printable onto a paper substrate;

providing instructions regarding manipulating the paper substrate to form a three-dimensional paper model replica of the actual object; and making the model file and instructions available to a user by allowing a user to access a computer site on a wide area computer network, providing, on the computer site, at least one model page, permitting the user to access the model page, and permitting the user to print at least one data file from the model page, the data file being useful for causing a computer printer to print a substrate having model indicia thereon, wherein the model indicia is useful for configuring the substrate into a three-dimensional paper model replica of the actual object.

* * * * *